United States Patent [19]

Sako

[11] Patent Number: 5,130,969
[45] Date of Patent: Jul. 14, 1992

[54] APPARATUS HAVING DEFECTIVE SECTOR COMPENSATION COUPLED WITH ANALOG INFORMATION MODE AND DIGITAL INFORMATION MODE RECORDING/REPRODUCING CAPABILITY

[75] Inventor: Yoichiro Sako, Chiba, Japan

[73] Assignee: Sony Corporation, Tokyo, Japan

[21] Appl. No.: 466,028

[22] Filed: Jan. 17, 1990

[30] Foreign Application Priority Data

Feb. 15, 1989 [JP] Japan .................. 1-35899
Feb. 16, 1989 [JP] Japan .................. 1-37114

[51] Int. Cl.$^5$ .............................................. G11B 7/00
[52] U.S. Cl. ............................... 369/58; 369/59; 369/53; 360/48; 360/53
[58] Field of Search ............... 360/53, 32, 48; 369/53–59

[56] References Cited

U.S. PATENT DOCUMENTS

| | | | |
|---|---|---|---|
| 4,558,446 | 12/1985 | Banba et al. | 371/10 |
| 4,768,181 | 8/1988 | Ichinose et al. | 369/54 |
| 4,796,113 | 1/1989 | Hayakawa | 369/54 X |
| 4,814,903 | 3/1989 | Kulakowski et al. | 360/48 |
| 4,833,163 | 5/1989 | Satoh et al. | 369/32 |
| 4,839,879 | 6/1989 | Sawada et al. | 369/54 |
| 4,984,230 | 1/1991 | Satoh et al. | 369/54 |

FOREIGN PATENT DOCUMENTS

| | | |
|---|---|---|
| 0073330 | 7/1982 | European Pat. Off. |
| 0165320 | 11/1984 | European Pat. Off. |
| 0219261 | 9/1986 | European Pat. Off. |

Primary Examiner—Robert L. Richardson
Attorney, Agent, or Firm—Philip M. Shaw, Jr.

[57] ABSTRACT

Input data is sequentially and consecutively recorded in a series of unit recording areas (sectors) on the record medium, and when a defective area is detected, corresponding data is stored in a memory until either the recording of said input data is finished or the capacity of the memory is exceeded, and then the data stored in the memory is recorded in an alternate area of the record medium. Further, an identifying information indicative of kinds of input data is recorded in a particular recording area of the record medium, wherein upon reproducing, reproduction processing can be automatically switched to read the alternate area in response to the identifying information and detection of a defective area.

6 Claims, 4 Drawing Sheets

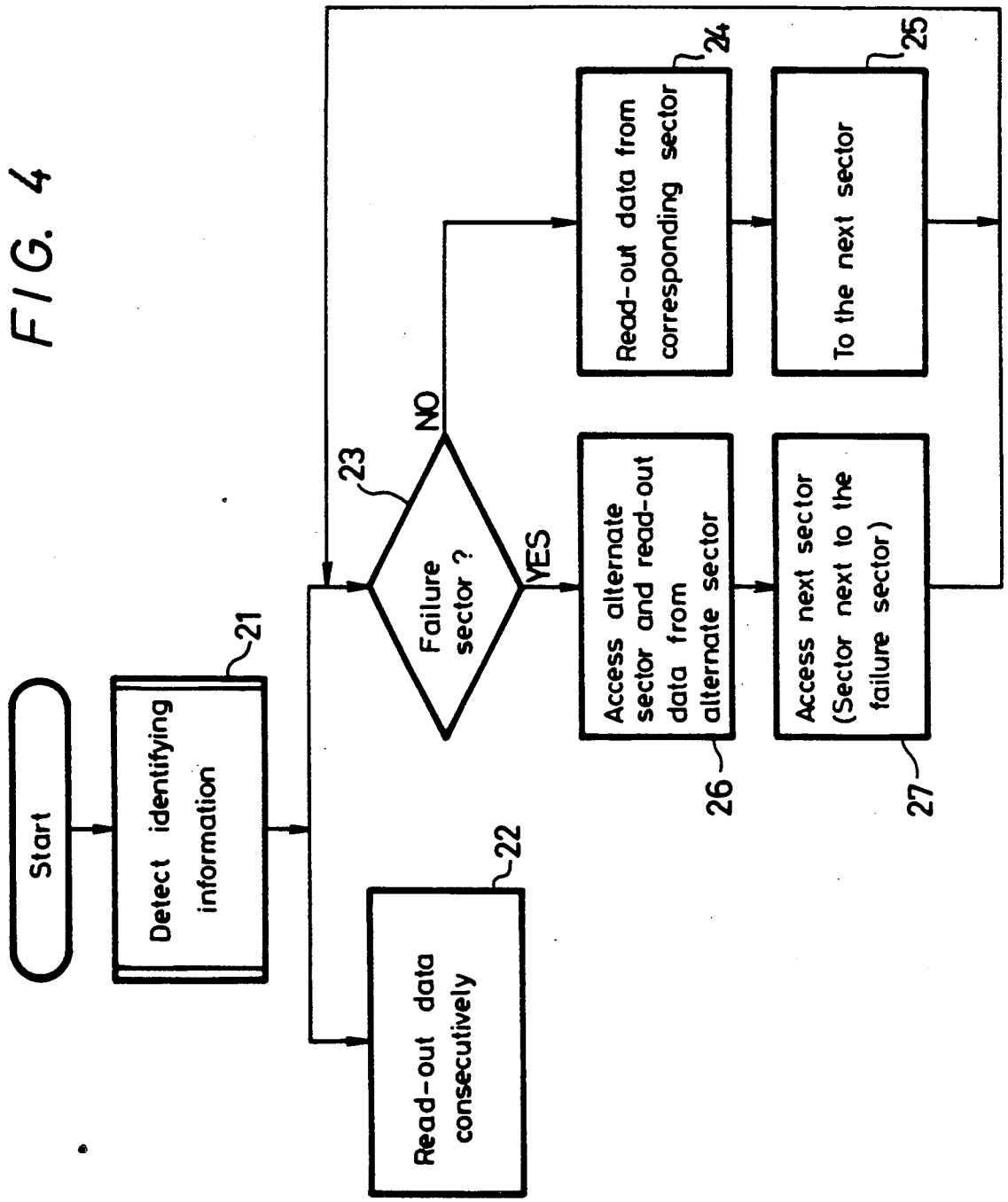

APPARATUS HAVING DEFECTIVE SECTOR COMPENSATION COUPLED WITH ANALOG INFORMATION MODE AND DIGITAL INFORMATION MODE RECORDING/REPRODUCING CAPABILITY

BACKGROUND OF THE INVENTION

1. Field of the Invention

The present invention relates generally to recording and reproducing apparatus and, more particularly, is directed to a data recording and reproducing apparatus suitable for recording, for example, audio data, video data or computer data on a record medium such as a disk.

2. Description of the Prior Art

Generally, when data is recorded on a record medium, two modes, i.e., a consecutive processing mode and, an alternate processing mode may be available. The term consecutive processing mode is used in this specification to the recording mode for recording digitized, analog information such as audio data, video data or the like, whereas the term "alternate processing mode" is used in this specification to refer to the recording of intermittent, digital data, such as during the storage of computer data.

A real time property is a very important factor for audio data, video data and so on used in the consecutive processing mode. In the case of audio data and video data or the like, the digitized, analog date have a correlation with each other to each other so that they can therefore be error-compensated, thus avoiding an influence of error to some extent.

In the alternate processing mode, if a sector of a hard disk or a magneto-optical disk or the like, in which data is to be written when it is shipped, is found to be defective due to scratches or the like, that defective sector is marked with a failure sector mark and is made useless. Then, corresponding data is written in an alternate sector prepared as a reserve sector. Alternatively, in the read-after-write mode, if an error rate is beyond a standard one, then data is to be written in the alternate sector.

Although the above-mentioned consecutive processing mode is advantageous in real time property, error of more than a certain error rate can not be processed. Thus, the consecutive processing mode is not so reliable. Further, although the alternate processing mode is very reliable, it has a problem of poor real time property.

OBJECTS AND SUMMARY OF THE INVENTION

Therefore, it is an object of the present invention to provide an improved data recording and reproducing apparatus which can eliminate the aforementioned defects encountered with the prior art.

More specifically, it is an object of the present invention to provide a data recording apparatus which can record data by effectively utilizing advantages of both a consecutive processing mode and an alternate processing mode.

It is another object of the present invention to provide a data reproducing apparatus which can reproduce data by effectively utilizing advantages of both a consecutive processing mode and an alternate processing mode.

As a first aspect of this invention, a data recording apparatus for sequentially recording input mixed digitized, analog data and intermittent digital data in a predetermined unit recording area of a record medium is provided. This data recording apparatus comprises a data identifying device for determining whether the input data is processed in a consecutive processing mode or in an alternate processing mode, a detector for detecting a defective recording area in the record medium when an alternate processing mode is detected by the data identifying device, and a memory for storing input data assigned to the defective recording area in response to an output of the detector, wherein data stored in the memory is recorded in another particular recording area of the record medium at the completion of recording the input data.

As a second aspect of the present invention, a data reproducing apparatus for reproducing data from a record medium in which data is recorded in a unit recording area and an identifying information indicative of the kinds of data is recorded in a particular area is provided. This data reproducing apparatus comprises an identifying information detecting device for detecting the identifying information wherein it is determined, in response to the detected identifying information, whether the data is reproduced in a consecutive processing mode or in an alternate processing mode.

The above, and other objects, features and advantages of the present invention, will become apparent in the following detailed description of a preferred embodiment of the invention to be read in conjunction with the accompanying drawings, in which like reference numerals are used to identify the same or similar parts in the several views.

BRIEF DESCRIPTION OF THE DRAWINGS

FIG. 4 is a flow chart to which reference will be made in explaining a reproducing operation of the present invention.

DETAILED DESCRIPTION OF A PREFERRED EMBODIMENT

A data recording and reproducing apparatus according to an embodiment of the present invention will now be described in detail with reference to FIGS. 1 to 3. In this embodiment, a magneto-optical disk is used as a record medium.

Figure 1:
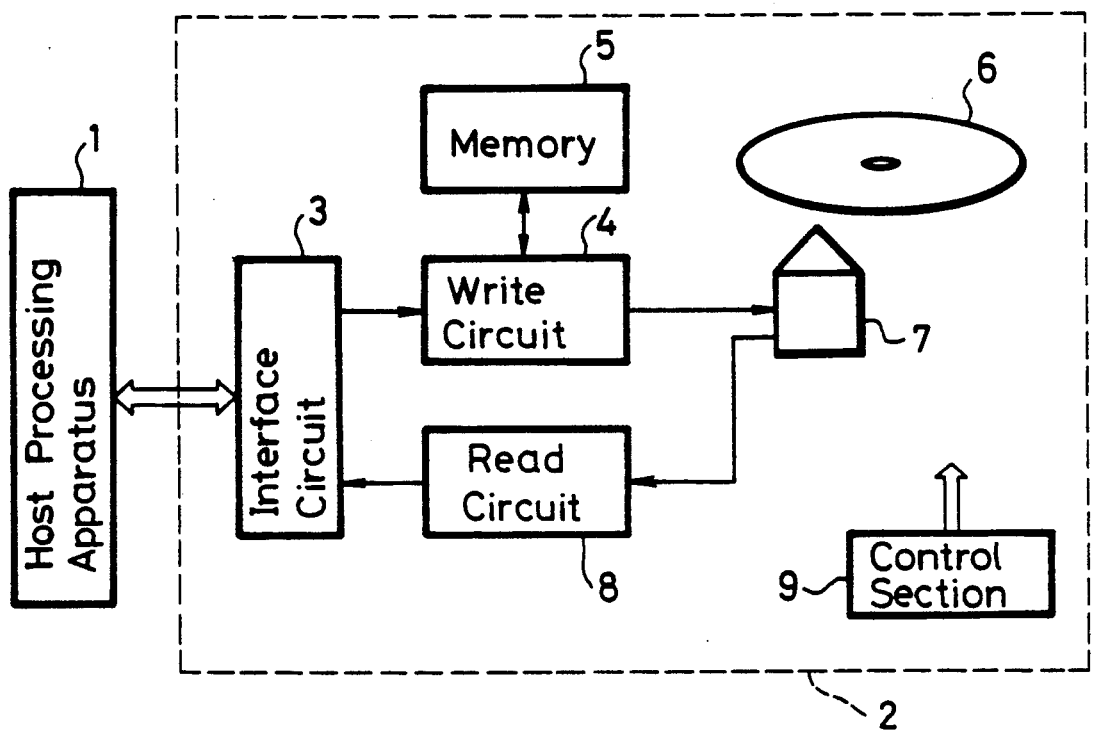
FIG. 1 is a schematic block diagram showing a data recording and reproducing apparatus according to an embodiment of the present invention.

FIG. 1 shows a circuit arrangement of this embodiment. In FIG. 1, it will be seen that a host computer 1 is connected to a magneto-optical disk recording and reproducing apparatus 2 for inputting and outputting data.

The magneto-optical disk recording and reproducing apparatus 2 comprises an interface circuit 3, a write circuit 4, a memory 5, a magneto-optical disk 6, a photo pickup head 7, a read circuit 8 and a control section 9.

The interface circuit 3 is connected to the host processing apparatus 1 to convert input and output signals. The write circuit 4 is supplied with an output signal of the interface circuit 3 as an input signal and supplies a signal to the photo pickup head 7 so that the photo pickup head 7 can write data in the magneto-optical disk 6. When a defective sector, such as failure sector, address-unreadble sector or the like, is detected in the recording mode, the memory 5, which is a buffer memory utilizing, for example, a random access memory (RAM), temporarily stores the data assigned to the defective sector. The photo pickup head 7 reads out data recorded on the magneto-optical disk 6 and supplies the read circuit 8 with the read-out data. The control section 9 controls the whole section of the magneto-optical disk recording and reproducing apparatus 2, and is connected to the respective blocks.

An operation of the data recording and reproducing apparatus of FIG. 1 when recording digital data will be described with reference to a flow chart of FIG. 2 which depicts the steps carried out by the control section 9. In this case, the data recording and reproducing apparatus 2 records, for example, computer data.

Figure 2:
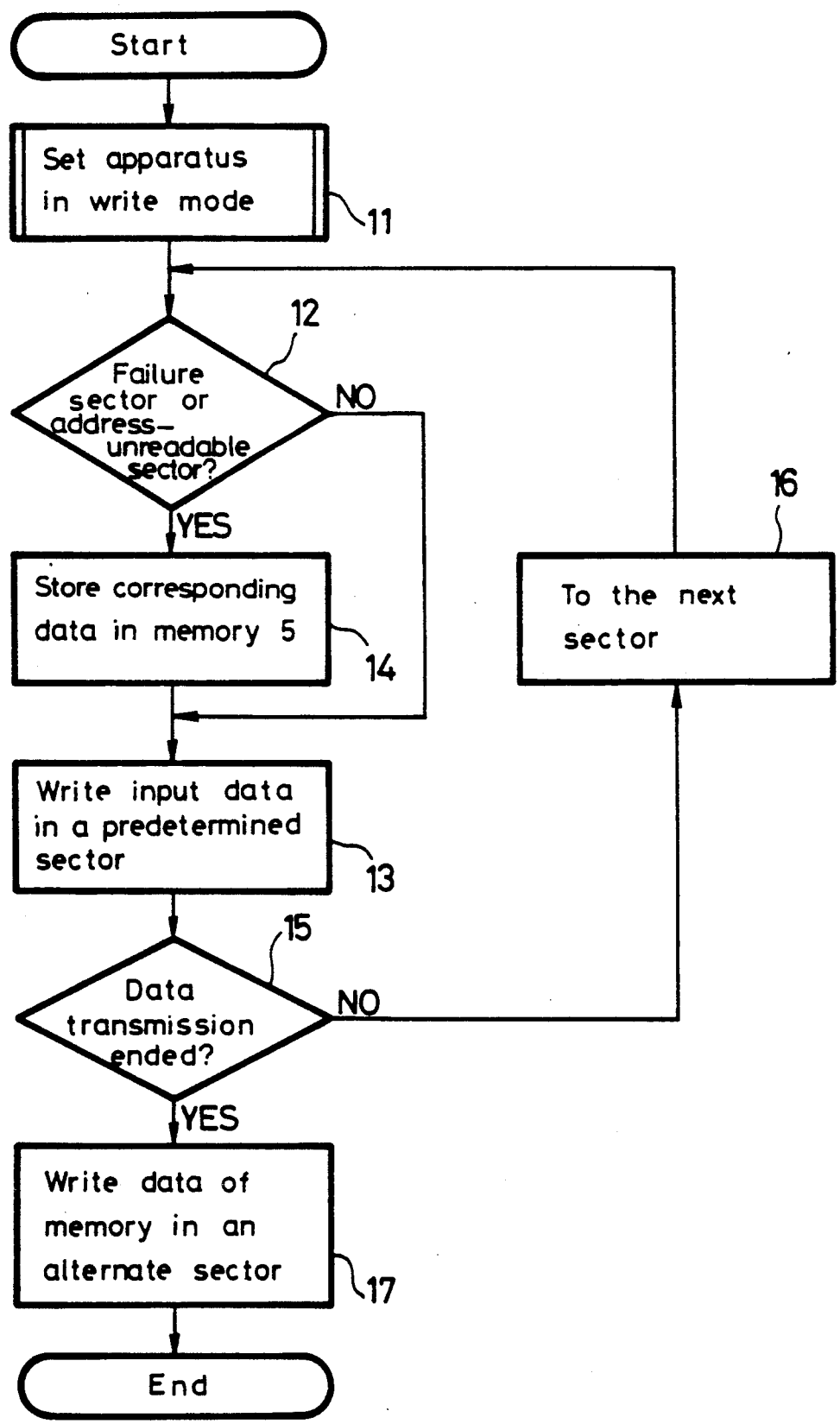
FIGS. 2 and 3 are flow charts to which reference will be made in explaining steps involved in routine for recording data according to the present invention.

Referring to FIG. 2, following the Start of operation, the magneto-optical disk recording and reproducing apparatus 2 is set in the write mode by a write command issued from the host processing apparatus 1 at step 11. Then, computer data from the host processing apparatus 1 is supplied through the interface circuit 3 to the write circuit 4. In the next decision step 12, it is determined by the write circuit 4 whether the particular sector to be written in is a failure sector or an address-unreadable sector, or whether or not the sector is an unrecordable sector. If a NO is output at step 12, then the routine proceeds to step 13, whereat the write circuit 4 writes the input data in a predetermined sector of the magneto-optical disk 6 by means of the photo pickup head 7.

If on the other hand a YES is output at step 12, then the routine proceeds to step 14, whereat the write circuit 4 stores the data assigned to the failure sector or the address-unreadable sector in the memory 5.

In the next decision step 15, it is determined whether or not the data transmission is ended. If a NO is output at step 15, then the routine proceeds to step 16, whereat the recording operation is moved to the next sector and the same steps as described above are repeated.

If it is determined that the transmission of all data is ended as represented by a YES at step 15, the routine proceeds to step 17, whereat the write circuit 4 reads out the data stored in the memory 5 and then writes the same in a particular unit recording area, for example, an alternate sector area of the magneto-optical disk 6 by means of the photo pickup head 7.

In step 14, if the storage area of the memory 5 is all occupied, the alternate processing mode may be changed to the ordinary consecutive processing mode, i.e. the writing of the data may be temporarily stopped and data may be written in the alternate sector.

A recording operation of the magneto-optical disk recording and reproducing apparatus of the invention when recording both digitized, analog data and intermittent, digital data will be described with reference to a flow chart forming FIG. 3 which depicts the steps carried out by the control section 9. In that case, data to be recorded is provided in the mixed form of audio data or video data together with computer data. In the following description, audio data or video data is referred to as audio/video data for convenience. In FIG. 3, like parts corresponding to those of FIG. 2 are marked with the same references.

Figure 3:
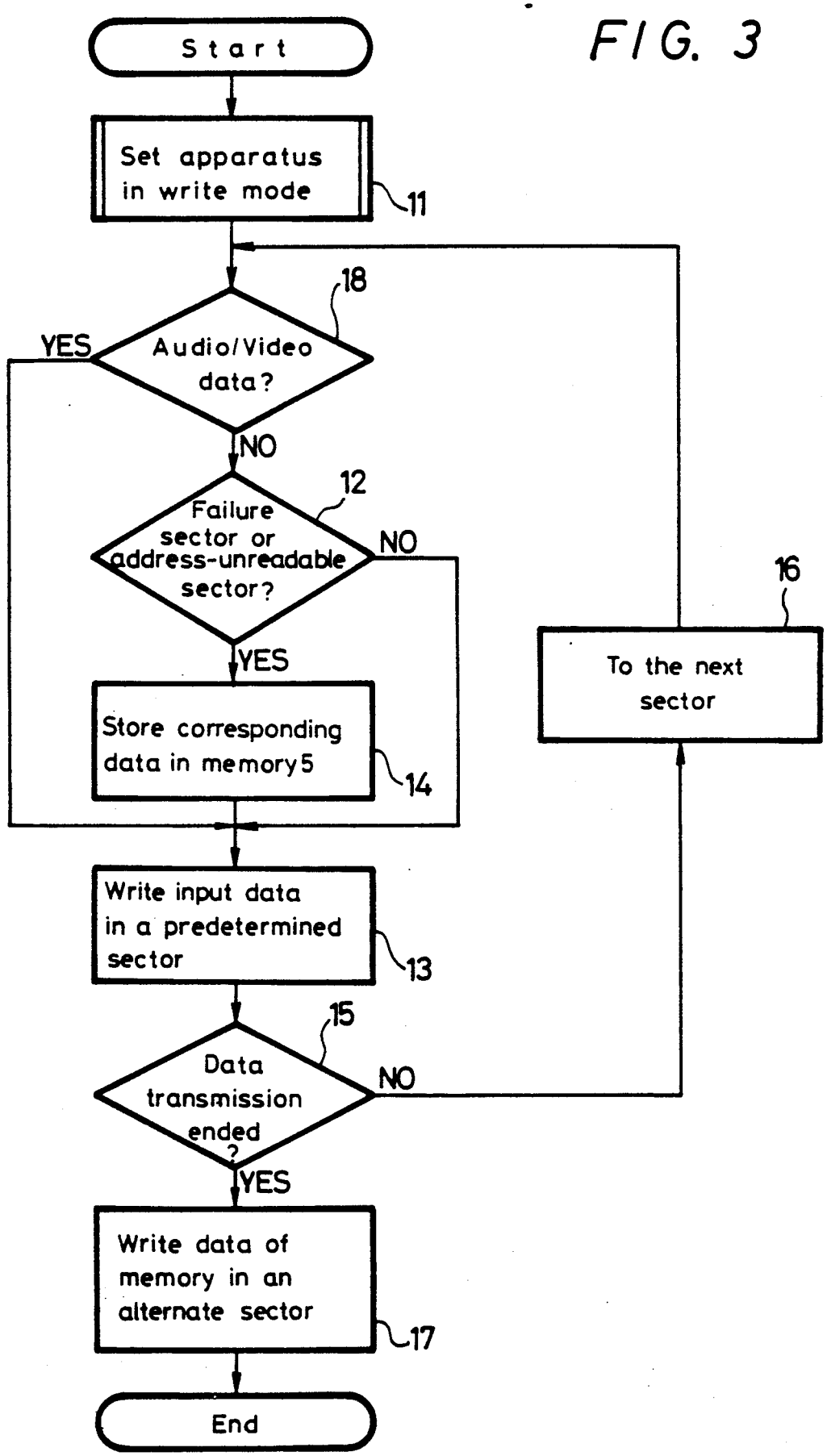

Referring to FIG. 3, following the Start of operation, in step 11, the magneto-optical disk recording and reproducing apparatus 2 is set in the write mode by a write command issued from the host processing apparatus 1, and data from the host processing apparatus 1 is supplied through the interface circuit 3 to the write circuit 4. In the next decision step 18, it is determined by the write circuit 4 whether the input data is the audio/video data or not. If a YES is output at step 18, then the routine proceeds to step 13, wherein the write circuit 4 writes the input audio/video data in a predetermined sector of the magneto-optical disk 6 by means of the photo pickup head 7.

If on the other hand it is determined that the input data is not, the audio/video data as represented by a NO at step 18, i.e., the input data is the computer data, the routine proceeds to decision step 12. It is determined at decision step 12 whether the predetermined sector about to be written in is a failure sector or an address-unreadable sector. If a NO is output at step 12, then the routine proceeds to step 13, in which, the write circuit 4 writes the input computer data in that predetermined sector of the magneto-optical disk 6 by means of the photo pickup head 7.

If a YES is output at step 12, then the routine proceeds to step 14. In step 14, the, write circuit 4 stores the computer data assigned to the failure sector or the address-unreadable sector in the memory 5. In decision step 15, it is determined whether the transmission of data is ended i.e. not. If a NO is output at step 15, or all the data transmission is not ended, in step 16, the next sector is selected and an operation similar to the above will be repeated.

If a YES is output at step 15, i.e., if the transmission of data is already finished, then the routine proceeds to step 17. In step 17, the write circuit 4 reads-out the computer data stored in the memory 5, and writes the read-out computer data in a particular unit recording area, for example, an alternate sector area of the magneto-optical disk 6 by means of the photo pickup head 7.

In step 14, if the storage area of the memory 5 is fully occupied, then the alternate processing mode may be changed to, for example, the ordinary consecutive processing mode so that the alternate processing mode may be temporarily interrupted and the computer data may be written in the alternate sector.

In the above-noted embodiment, the alternate sector area may be an intermediate portion of the disk or one portion of a predetermined track of the outer peripheral portion of the disk. Further, the alternate sector area may be distributed to a plurality of sectors or a plurality of tracks.

As set out above, according to the present invention, when input data is consecutively recorded in the unit recording area of the record medium, a defective recording area such as a failure sector or a address-unreadable sector or the like is detected, data assigned to that sector is stored in a buffer memory. When the transmission of all of the data is finished, the data stored in the buffer memory is read-out and the read-out data is recorded in a particular recording area such as an alternate sector on the record medium. Thus, it becomes possible to achieve real time property and high reliability which are advantages of both the consecutive processing mode and the alternate processing mode.

Figure 5:
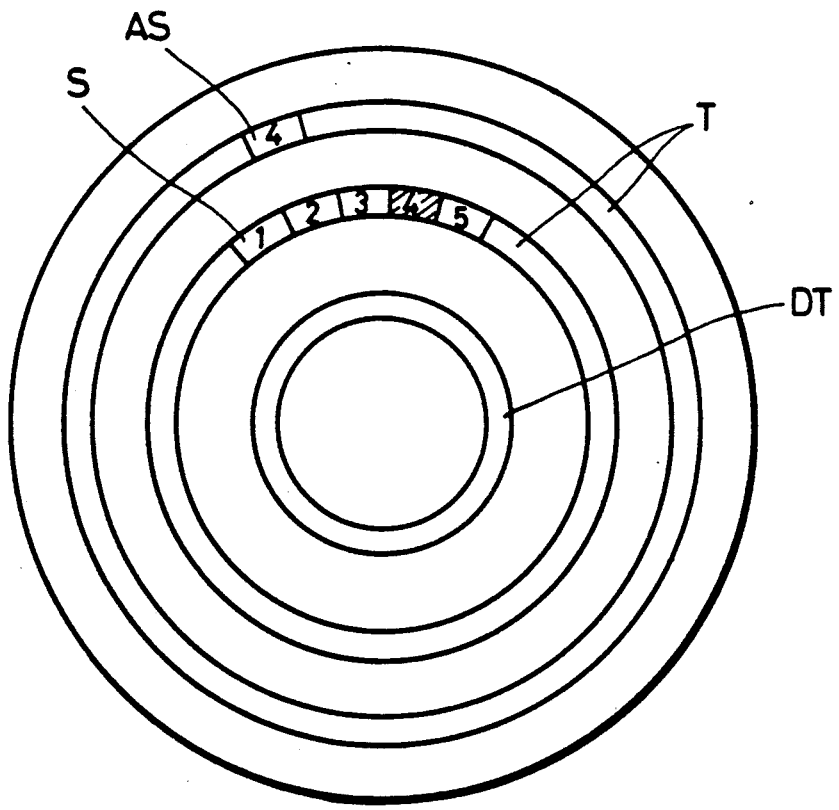
FIG. 5 is a schematic planar view of a disk, and to which reference will be made in explaining a data allocation in an alternate processing mode.

The processing in the reproducing mode will next be described with reference to FIGS. 4 and 5.

As shown in a flow chart forming FIG. 4, which depicts the steps carried out by the control section 9 following the Start of operation, the playback of data from the magneto-optical disk 6 is started. In the next step 21, an identifying information indicative of the kinds of data recorded on this record medium, i.e. whether the data is processed in accordance with the consecutive processing mode or the alternate processing mode, is detected. The identifying information has been previously recorded in a unit recording area of this record medium, i.e, a predetermined position of sector S or a directory track DT.

If the identifying information detected at step 21 indicates the consecutive processing mode, i.e. if the data is digitized analog such as audio data, video data and so on, then the routine proceeds to step 22. In step 22, the data is consecutively read-out, thereby effecting the consecutive processing.

If on the other hand the identifying information detected, in step 21 indicates the alternate processing mode, i.e. if the data is intermittent data such as computer data, character data or the like, then the routine enters step 23 and the following steps.

In the decision step 23, it is determined whether the sector, from which data is to be read, is a defective sector or not. If a NO is output at step 23, the routine proceeds to step 24, whereat data in that sector is read-out. Then, the routine proceeds to step 25 through which the routine advances to read the next sector and returns to decision step 23. In step 23, it is determined whether the sector is a defective sector or not. If a NO is output at step 23, then the routine proceeds to step 24, whereat the data in that sector is read-out. Then, the same operation is repeated.

If on the other hand it is determined that the sector, from which data is to be read-out, is a defective sector as represented by a YES at step 23, the routine proceeds to step 26. In step 26, the alternate sector corresponding to a defective sector is accessed, and the data of that alternate sector is read-out. In the next step 27, the next sector, that is, the sector next to a defective sector is accessed. Then the routine returns to decision step 23, whereat the check for a defective sector is repeated.

The operation of the alternate processing in the steps following step 23 will be described more fully with reference to FIG. 5. FIG. 5 illustrates a recorded pattern of a record medium. In FIG. 5, a hatched sector, i.e., the fourth sector is assumed to be a defective sector, and data designating a corresponding alternate sector As, processed by the alternate processing mode, is recorded in the directory track DT.

The first sector is determined as being not an incorrect sector in step 23 so that data recorded in the first sector is read-out in step 24. This is also true for the second and third sectors. The fourth sector is determined as a failure sector in step 23 so that a corresponding alternate sector provided in another track, for example, is accessed, and data recorded in the alternate sector AS corresponding to the fourth sector is read-out. In step 27, a fifth sector next to the fourth sector, which is the defective sector, is accessed, and then the routine returns to decision step 23. In decision step 23, it is determined whether or not the fifth sector is a defective sector. Since the fifth sector is not a defective sector, data recorded in the fifth sector is read-out in step 24. The similar operation is repeatedly carried out hereinunder.

In accordance with this embodiment, when consecutive data such as audio data, video data and so on or intermittent data such as character data or the like is solely recorded or when consecutive data and intermittent data are recorded in a mixed state, by recording the identifying code in the sector or in the directory track DT, it is possible to reproduce data by selectively switching the consecutive processing mode and the alternate processing mode in response to the thus recorded identifying information. In general, consecutive data such as audio data, video data and so on can be error-compensated and need not be increased in reliability by switching from consecutive processing mode to the alternate processing mode. It is frequently requested to improve reliability at the sacrifice of real time property. The data recording and reproducing apparatus of the present invention can be applied to such a case.

As described above, since the consecutive processing mode and the alternate processing mode are selectively switched in response to the identifying information, data can be properly reproduced by one system in accordance with various uses. Therefore, it is possible to maintain real time property and high reliability which are advantages of the consecutive processing mode and the alternate processing mode.

Having described a preferred embodiment of the invention with reference to the accompanying drawings, it is to be understood that the invention is not limited to that precise embodiment and that various changes and modifications could be effected by one skilled in the art without departing from a spirit or scope of the invention as defined in the appended claims.

I claim as my invention:

1. A data recording apparatus for sequentially recording input consecutive data in a predetermined unit recording area of a record medium, comprising:
   (a) detecting means for detecting a defective recording area in the record medium;
   (b) a memory for storing, in response to an output of the detecting means, input data assigned to a defective recording area, wherein data stored in the memory is recorded in an alternate recording area of the record medium at the completion of the recording of the input data; and
   (c) storage capacity watching means for watching the data amount stored in the memory, wherein when the data amount reaches a predetermined value, data stored in the memory is recorded in a first particular recording area of the record medium.

2. The data recording apparatus according to claim 1, wherein data representative of a corresponding relationship between the defective recording area and the first particular recording area is recorded in a second particular recording area of the record medium.

3. A data recording apparatus for sequentially recording input consecutive data in a predetermined unit recording area of a record medium, comprising:
   (a) detecting means for detecting a defective recording area in the record medium;
   (b) a memory for storing, in response to an output of the detecting means, input data assigned to a defective sector, wherein data stored in the memory is recorded in an alternate recording area of the record medium at the completion of the recording of the input data; and
   (c) storage capacity watching means for watching the data amount stored in the memory, wherein when the data amount reaches a predetermined value, writing in the memory is inhibited.

4. A data recording apparatus for sequentially recording input data in a predetermined unit recording area of a record medium, comprising:
   (1) data identifying means for determining whether the input data is digitized, analog data or intermittent, digital data;
   (2) detecting means for detecting a defective recording area in the record medium when intermittent, digital data is detected by the data identifying means and generating a corresponding output signal; and
   (3) a memory for storing, in response to the output signal of the detecting means, input data assigned to a defective recording area wherein data stored in the memory is recorded in an alternate recording area of the record medium at the completion of the recording of the input data.

5. The data recording apparatus according to claim 4, wherein an identifying signal for determining whether the recorded data is digitized, analog data or intermittent, digital data is recorded in a particular area of the record medium in response to an output of the data identifying means.

6. A data reproducing apparatus for reproducing data from a record medium in which the data is recorded in a unit recording area and an identifying information, indicative of whether or not the recorded data includes intermittent, digital data, is recorded in a particular area, comprising:
   identifying information detecting means for detecting the identifying information wherein it is determined, in response to the detected identifying information, whether the recorded data includes intermittent, digital data; and
   detecting means, controlled by the identifying information detecting means, for detecting a defective area in the record medium, and reproducing recorded intermittent, digital data corresponding to the defective area and recorded in an alternate recording area of the record medium.

* * * * *